United States Patent [19]

Shigaki

[11] Patent Number: 4,608,683

[45] Date of Patent: Aug. 26, 1986

[54] TEST APPARATUS FOR DIGITAL SPEECH INTERPOLATOR FOR USE IN TIME DIVISION MULTIPLE ACCESS SCHEME

[75] Inventor: Seiichiro Shigaki, Tokyo, Japan

[73] Assignee: NEC Corporation, Tokyo, Japan

[21] Appl. No.: 623,870

[22] Filed: Jun. 25, 1984

[30] Foreign Application Priority Data

Jun. 25, 1983 [JP] Japan ................................ 58-113626

[51] Int. Cl.⁴ ........................... H04J 1/16; H04J 3/14; G01R 31/28; G06F 11/00
[52] U.S. Cl. ......................................... 370/13; 371/25
[58] Field of Search ...................... 370/13, 17; 371/25, 371/26; 324/73 AT; 364/383

[56] References Cited

U.S. PATENT DOCUMENTS

| | | | |
|---|---|---|---|
| 4,002,841 | 1/1977 | Chino et al. | 370/81 |
| 4,138,599 | 2/1979 | Munter | 370/13 |
| 4,139,147 | 2/1979 | Franke | 371/25 |
| 4,377,822 | 3/1983 | Noirel et al. | 370/17 |
| 4,503,536 | 3/1985 | Panzer | 371/25 |
| 4,525,789 | 6/1985 | Kemper et al. | 371/26 |

Primary Examiner—Douglas W. Olms
Assistant Examiner—Frank M. Scutch, III
Attorney, Agent, or Firm—Sughrue, Mion, Zinn, Macpeak, and Seas

[57] ABSTRACT

An apparatus for testing the operation of a digital speech interpolator provided in a transmitting station and a receiving station in a time division multiple access scheme (DSI/TDMA). The apparatus comprises a transmitting unit and a receiving unit. In the transmitting unit at the transmitting station, a pseudo random code for each one of a plurality of channels is generated, a channel identifying signal is generated, a fixed signal having a level lower than a detectable level of a tone detector of the digital speech interpolator (DSI) at the transmitting station is generated, and a pseudo tone burst signal for each channel is generated. The pseudo random code, the channel identifying signal and the fixed signal are used under the control of the pseudo tone burst signal, for generating a time division multiplex signal. The time division multiplex signal is supplied to the DSI at the transmitting station. In the receiving unit at the receiving station, the signal sent from the DSI on the transmitting station is received for detecting the pseudo random code, the channel identifying signal and the fixed signal.

6 Claims, 7 Drawing Figures

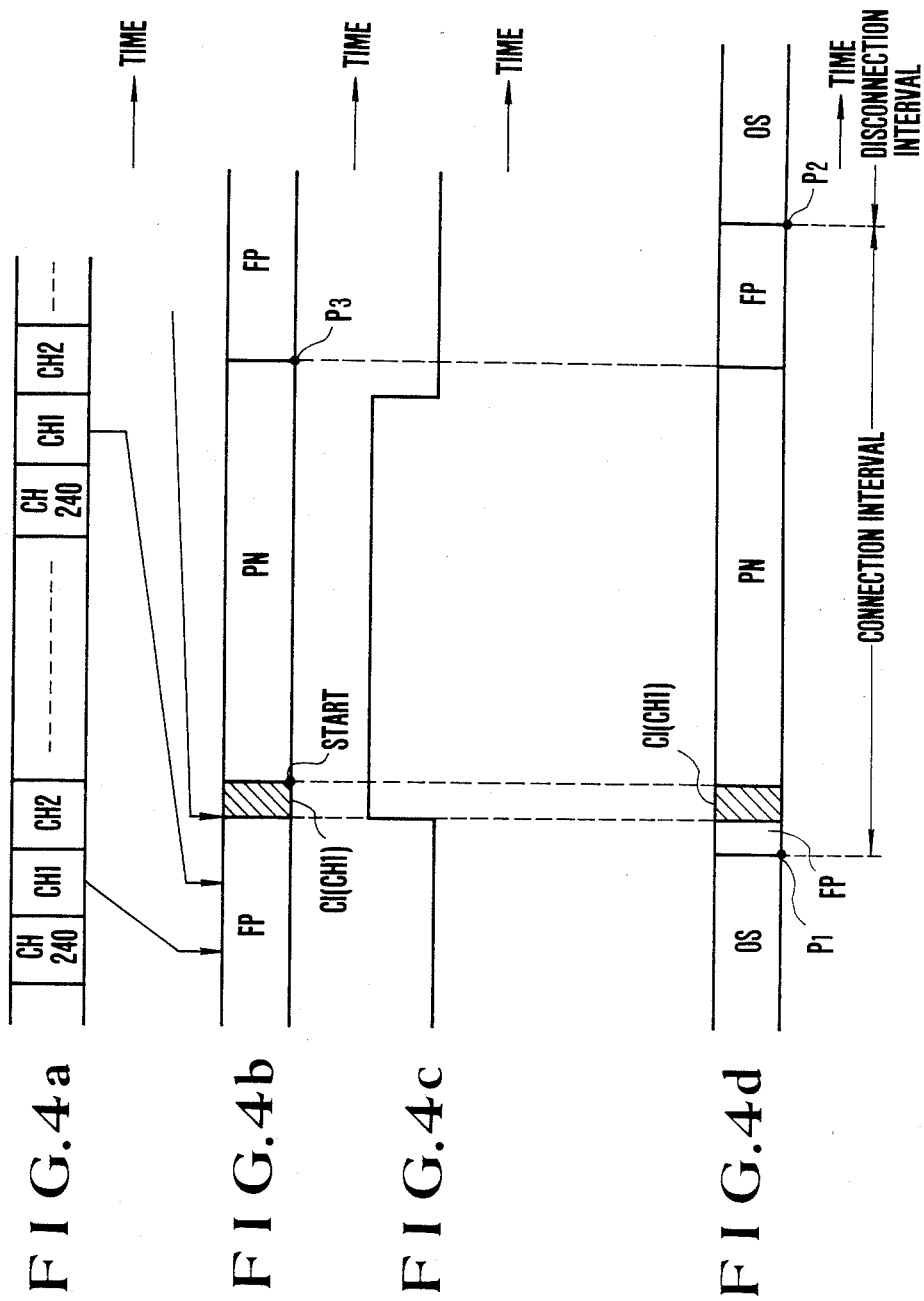

TEST APPARATUS FOR DIGITAL SPEECH INTERPOLATOR FOR USE IN TIME DIVISION MULTIPLE ACCESS SCHEME

BACKGROUND OF THE INVENTION

This invention relates to apparatus for testing the operation of a digital speech interpolator (DSI) for use in a time division multiple access (TDMA) scheme.

DSI is used for speech lines requiring a relatively expensive transmission path, for example, a satellite communication or the like. DSI efficiently utilizes transmission lines by transmitting speech signals during only the speech activity time. Accordingly the number of transmission lines which DSI requires is about half the number speech lines. Regarding details of DSI, reference should be made to U.S. Pat. No. 4,002,841. Since the transmission lines are expensive, the DSI must be used as efficiently and effectively as possible; therefore DSI is required to have flexibility in establishing transmission lines and to avoid trouble or fault time.

When checking or testing whether the DSI is operating normally or not due to fault, especially, when checking whether the line connection establishment (determining which channel of TDMA should be used to interconnect speech lines) is correct or not, it has been the prior art practice to actually pass a speech signal through each channel. With such a method of checking, however, a long time is necessary for the check, and that automatic checking is difficult.

SUMMARY OF THE INVENTION

It is an object of this invention to provide a novel test apparatus capable of automatically and instantaneously checking the operation state of the DSI.

According to the present invention, there is provided an apparatus for testing the operation of a digital speech interpolator provided in a transmitting station and a receiving station in a time division multiple access scheme (DSI/TDMA), the apparatus comprising a transmitting unit and a receiving unit, characterized in that the transmitting unit at the transmitting station includes:

means for generating a pseudo random code for each one of a plurality of channels;

means for generating a channel identifying signal;

means for generating a fixed signal having a level lower than a detectable level of a tone detector of the digital speech interpolator (DSI) on the transmitting station;

means for generating a pseudo tone burst signal for each channel;

means supplied with the pseudo random code, the channel identifying signal and the fixed signal, and controlled by the pseudo tone burst signal, for generating and supplying a time division multiplex signal to said DSI on the transmitting station, and that the receiving unit at the receiving station includes:

means supplied with the signal sent from the DSI in the transmitting station, for detecting the pseudo random code, the channel identifying signal and the fixed signal.

BRIEF DESCRIPTION OF THE DRAWINGS

In the accompanying drawings:

FIGS. 4a thru 4d show timing charts useful to explain the operation of the test apparatus according to the invention.

DESCRIPTION OF THE PREFERRED EMBODIMENT

Figure 1:
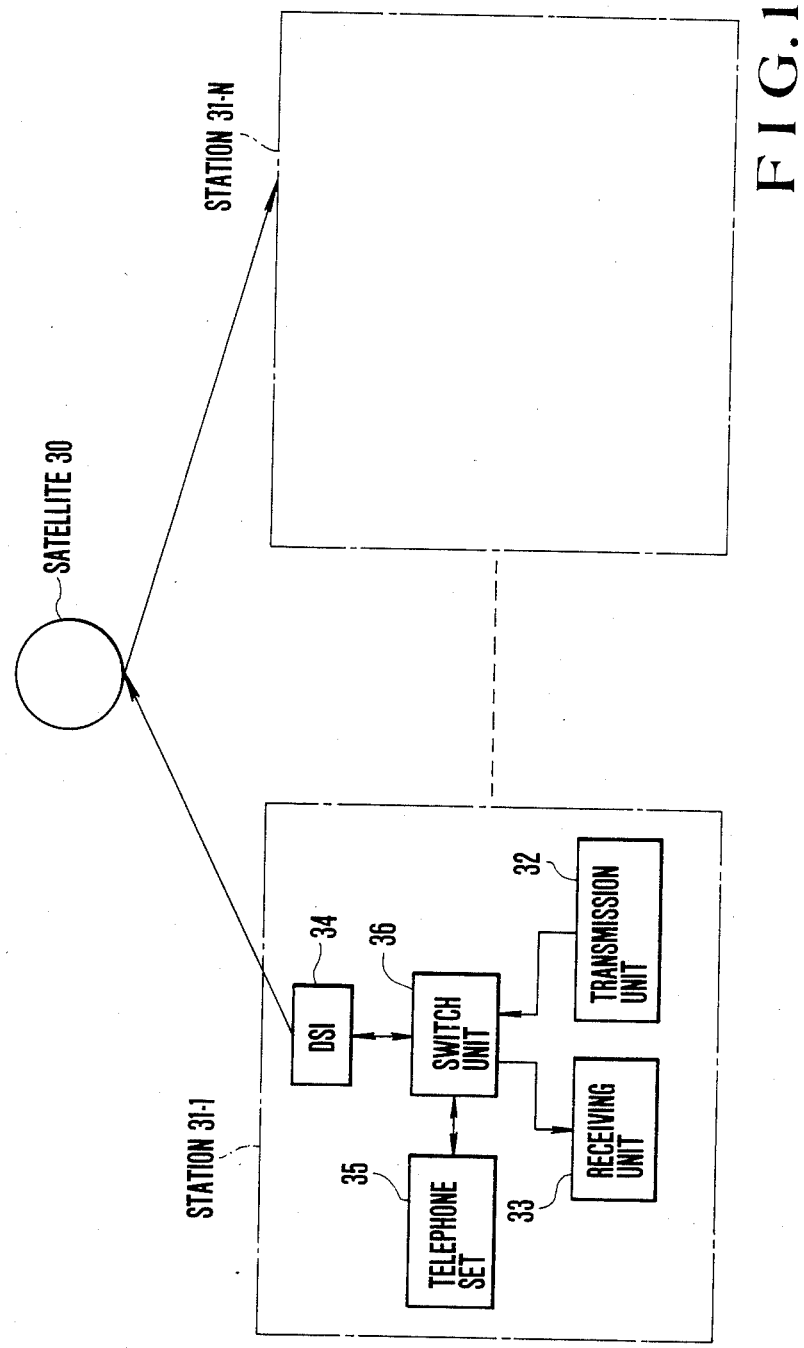
FIG. 1 is a schematic showing a satellite communication system to which the present invention is applicable.

The present invention is applicable to a satellite communication system as shown in FIG. 1. For example, 3000 stations 31-1, ..., 31-N (N=3000) are involved in this communication system. According to this invention, each station comprises a transmission unit 32, a receiving unit 33, a DSI 34, a telephone set 35, and a switch unit 36. The transmission and receiving units 32 and 33 constitute a DSI test apparatus. Communications are performed between the stations by way of a satellite 30 which operates under a time division multiple access scheme in which 1000 channels, for example, constitute one frame. The number of channels on the satellite is $\frac{1}{3}$ of the number of stations but the DSI permits communications between any combinations of the stations. The switch unit 36 normally connects the DSI 34 to the telephone set 35 in the normal communication mode but switches the DSI 34 to the DSI testing apparatus in the test mode. Thus, during the test mode, a test signal sent from the transmission unit of the test apparatus located in, for example, the first station 31-1 is received by the receiving unit of the test apparatus located in for example, the N-th station 31-N by way of, for example, No. 1 channel of the satellite 30.

The construction of the transmission unit 32 will first be described with reference to FIG. 2. As shown, the transmission unit 32 comprises a pseudo random code generator 1 including a random access memory (RAM) 1a having a capacity of 240 channels×7 bits and a feedback shift register 1b. The pseudo random code approximates a speech signal and contains almost all the combinations of "1" and "0" so as to match various characteristics of the transmission path. Transmission unit further comprises a channel identifying signal generator 2 constituted by an address counter 2a and a parallel series converter 2b which converts a parallel bit channel address PCA outputted from the address counter 2a into a series bit channel address, a fixed pattern generator 3 generating a fixed pattern having a level lower than the detectable level of a voice detector, not shown, of the DSI, and a pseudo tone burst signal generator 4 generating a pseudo tone burst signal PSB for each channel in synchronism with a channel address PCA outputted from the address counter 2a. The fixed pattern approximates the absence of speech and is represented by an all "0" code. The pseudo tone burst signal approximates a typical speech pattern which contains, for example, 30% speech activity interval and 70% speech inactivity interval in succession. There is also provided a test signal generator 5 supplied with a pseudo random code PN from the feedback register 1b of the pseudo random code generator 1, a channel identifying signal CI from the channel identifying signal generator 2, and a fixed pattern FP from the fixed pattern generator 3. This test signal generator 5 delivers a time division multiplex test signal TS to the DSI 34 via the switch unit 36 under the control of a pseudo tone burst signal PSB from the pseudo tone burst signal generator 4.

In the specific construction of the test signal generator 5 the generator 5 comprises a delay circuit 5a that delays the pseudo tone burst signal PSB by one frame, an inhibit gate 5b for producing a logical product of the pseudo tone burst signal PSB and a negated signal of the output from the delay circuit 5a, an AND gate 5c for controlling the channel identifying signal C1 with the output of the inhibit gate 5b, an AND gate 5d for controlling the pseudo random code PN in accordance with the output of the delay circuit 5a, and an inhibit gate 5e for controlling the fixed pattern FP in accordance with a negated signal of the output of the delay circuit 5a.

Figure 2:
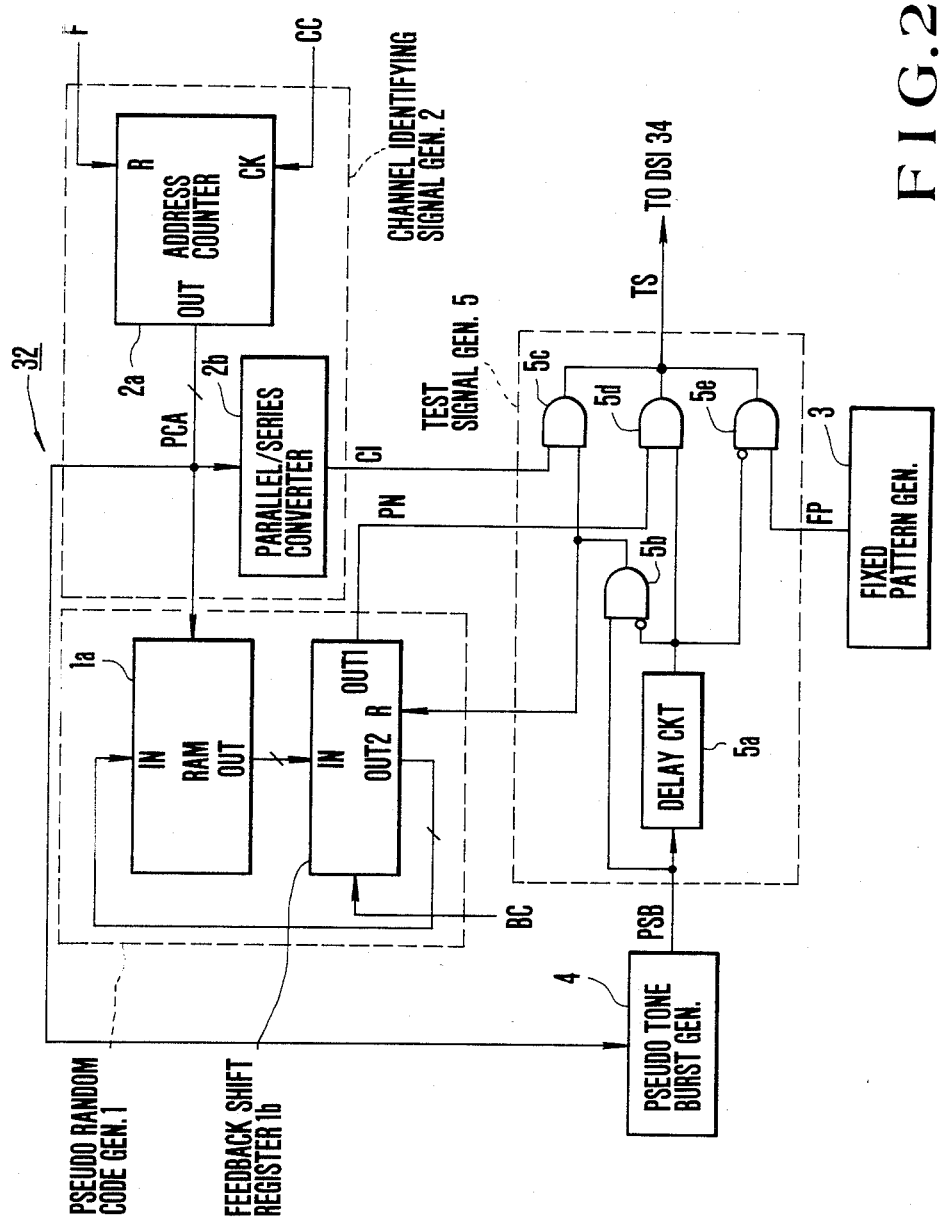
FIG. 2 is a block diagram showing one example of the transmission unit of the DSI/TDMA test apparatus embodying the invention.

The operation of the transmission unit 32 shown in FIG. 2 is as follows. The content of the address counter 2a is counted up by a channel clock pulse CC and reset by a frame signal F so as to supply the channel address PCA to the RAM 1a, pseudo tone burst signal generator 4 and parallel/series converter 2b. The RAM 1a delivers the content (a pseudo random code, one frame before) of an address (channel) designated by the channel address PCA to the feedback shift register 1b.

This feedback shift register 1b causes the read out random code PN one frame before to be subjected to a calculation in accordance with a bit clock pulse BC to supply its series output (a pseudo random code PN) to one input of the AND gate 5d. At the same time, the result of the arithmetic operation is restored in parallel in the RAM 1a. The pseudo tone burst generator 4 includes a feedback register, not shown, as one of its component elements.

This feedback shift register is subjected to a calculation to provide the pseudo tone burst signal PSB which assumes a high level during each speech activity time. This pseudo tone burst signal PSB is read out for each channel by the channel address PCA. The pseudo tone burst signal PSB thus read out is applied to the test signal generator 5 to act as a control signal.

In the test signal generator 5, the pseudo tone burst signal PSB is applied to the delay circuit 5a and to one input of the inhibit gate 5b. The pseudo tone burst signal PSB from the previous frame is outputted from the delay circuit 5a and is applied to the other input of the inhibit gate 5b. By the output of the inhibit gate 5b, the feedback shift register 1b is reset each time the tone burst rises. The output of the inhibit gate 5b is also applied to one input of the AND gate 5c which in turn outputs the channel identifying signal CI applied to the other input each time the tone burst rises. In accordance with the output of the delay circuit 5a, the AND gate 5d produces the pseudo random code PN generated by the pseudo random code generator 1 during the speech activity time. The inhibit gate 5e is responsive to the output of the delay circuit 5a to deliver out the fixed pattern FP outputted from the fixed pattern generator 3 during the speech inactivity time. The channel identifying signal CI from the AND gate 5c, the pseudo random code PN from the AND gate circuit 5d and the fixed pattern FP from the inhibit gate 5e are sent out, as a time division multiplex test signal TS, to the DSI from the test signal generator 5.

The DSI receives the test signal TS and performs a DSI operation for each channel.

FIGS. 4a to 4d show a timing chart for explaining the operation of the DSI test apparatus. As shown in FIG. 4a, the time division multiplex test signal TS of 240 channels is sent to the DSI. As shown in FIG. 4b, the first channel signal of these multiplex signals is constituted by a fixed pattern FP, a channel identifying signal CI representing the first channel, a pseudo random code PN, and a fixed pattern FP which are generated in accordance with a pseudo tone burst signal PCB (see FIG. 4C). The DSI of the first station (see FIG. 1) assigns the first channel signal to the N-th station, for example, by the digital signal interpolation through a medium (satellite in the case of satellite communications) under the TDMA scheme. The DSI of the N-th station receives the first channel signal, which is sent to the receiving unit (33) of test apparatus in the N-th station. Thus, the receiving unit receives a signal as shown in FIG. 4d corresponding to the test signal shown in FIG. 4b. The received signal of FIG. 4d is constituted by an all zero signal OS, a fixed pattern FP, a channel identifying signal CI representing the first channel, a pseudo random code PN, a fixed pattern FP, and an all zero signal OS.

In the received signal, the fixed pattern FP, channel identifying signal CI, pseudo random code PN, and fixed pattern FP which are confined within a connection interval correspond to those in the test signal of FIG. 4b and are actually transmitted from the transmission unit through the communication line. The all zero signal OS confined within a disconnection interval is not transmitted from the transmission unit but is prepared in the receiving station.

The connection interval is extended as compared to the interval of the sum of the channel identifying signal CI and pseudo random code PN in the test signal shown in FIG. 4b, including the preceding and succeeding fixed patterns FP. The start point P1 of the connection interval falls in the preceding fixed pattern FP in consideration of an initiation delay of the tone detector in the DSI, and the end point P2 falls in the succeeding fixed pattern FP because of a termination delay of the DSI tone detector.

In the test signal of FIG. 4b, the pseudo random code PN is retarded to start with respect to the initiation or rising of the pseudo tone burst signal PSB, so that the termination point P3 of the code PN is displaced from the termination or falling of the burst signal PSB.

Figure 3:
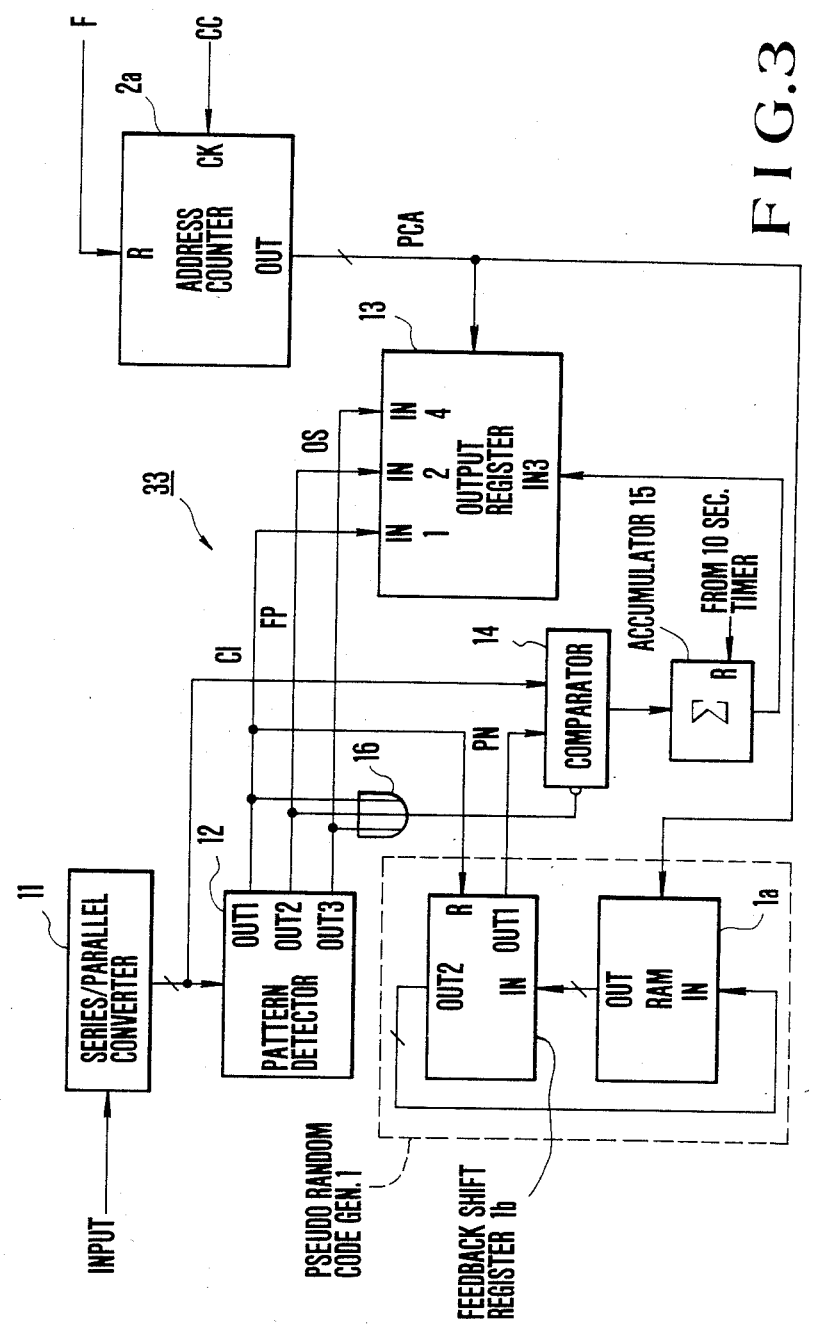
FIG. 3 is a block diagram showing one example of the receiving unit of the DSI/TDMA test apparatus embodying the invention.

The construction of the receiving unit 33 will now be described with reference to FIG. 3 in which circuit elements identical to those shown in FIG. 2 are designated by the same reference characters. Thus, numeral 11 designates a series/parallel converter which converts a received series signal into a parallel signal, 12 a pattern detector supplied with the output of the series/parallel converter 11 for detecting a channel identifying signal CI, a fixed pattern FP and an all zero signal OS (disconnection signal). Denoted by 13 is an output register which writes the result of detection of the pattern detector 12 into an address designated by a channel address PCA from an address counter 2a. Denoted by 14 is a comparator adapted to compare the output signal (received signal) of the series parallel converter 11 with the output of a pseudo random code generator 1. When the inputs of the comparator 14 are not coincident, the comparator 14 produces an output "1" indicative of transmission error. An accumulator 15 accumulates the "1" output of the comparator 14 (transmission error) every ten seconds. The value accumulated by the accumulator 15, for example, 250, 100 or 30 depending on the degree of transmission error, is written into the output register 13. The logic sum of the output of the pattern detecvtor 12 is calculated by an OR gate 16 and its output controls the operation of the comparator 14 such that the comparator 14 is allowed to operate only at the pseudo random code PN.

Since the receiving unit is constructed as described above, the state of connection of the DSI can be known by reading the content of the output register 13 for each address.

As can be noted from the foregoing description, according to this ivention, it is possible to automatically and instantaneously check whether the DSI operates correctly or not.

What is claimed is:

1. An apparatus for testing the operation of a digital speech interpolator provided in a transmitting station and a receiving station in a time division multiple access scheme (DSI/TDMA), said apparatus comprising a transmitting unit and a receiving unit, said transmitting unit at the transmitting station comprising:

first means for generating a pseudo random code for each one of a plurality of channels;

second means for generating a channel identifying signal;

third means for generating a fixed signal having a level lower than a detectable level of a tone detector of said digital speech interpolator (DSI) on the transmitting station;

fourth means responsive to said second means for generating a pseudo tone burst signal for each channel;

fifth means connected to said first means and being supplied with said pseudo random code, connected to said second means and being supplied with said channel identifying signal, connected to said third means and being supplied with said fixed signal, and connected to said fourth means and being controlled by said pseudo tome burst signal, for generating and supplying a time division multiplex signal to said DSI at the transmitting station; and said receiving unit at the receiving station comprising:

means supplied with said signal sent form said DSI at the transmitting station for detecting said pseudo random code, said channel identifying signal and said fixed signal.

2. The DSI/TDMA testing apparatus according to claim 1 wherein said second means comprises a source of channel clock pulses and a source of frame signals, an address counter which counts the number of said channel clock pulses and is reset by a frame signal, said second means applying a channel address signal to said fourth means, whereby a pseudo tone burst signal is generated for each channel, and said first means whereby a pseudo random code is generated for each channel.

3. The DSI/TDMA testing apparatus according to claim 2 wherein said second means further comprises a parallel series converter which converts a parallel channel address signal generated by said address counter into a series bit channel address signal, said signal being supplied to said fifth means.

4. The DSI/TDMA testing apparatus according to claim 1 wherein said first means comprises a feedback shift register and random access memory (RAM) which outputs to said feedback shift register the content of an address of said RAM designated by said channel identifying signal, said feedback shift register supplying one output to said time division multiplex signal generating means and feeding back another output to said RAM.

5. The DSI/TDMA testing apparatus according to claim 4 wherein said fifth means comprises a delay circuit for delaying said pseudo tone burst signal by one frame, a first inhibit gate inputted with said pseudo tone burst signal and an output of said delay circuit for applying a reset signal to said feedback shift register, a first AND gate inputted with said one output of said feedback shift register and the output of said delay circuit, a second AND gate inputted with said channel identifying signal and the output of said first inhibit gate and a second inhibit gate inputted with said fixed signal and the output of said delay circuit, the outputs of said first and second AND gate circuits and said second inhibit gate constituting said time division multiplex signal.

6. The DSI/TDMA testing apparatus according to claim 1 wherein said receiving unit comprises a series/parallel converter which converts a series signal received from said transmitting unit into a parallel signal, a pattern detector connected to said converter which detects said channel identifying signal, said fixed signal and an all zero signal, an address counter means comprising a source of clock and frame signals and an address counter, an output register connected to said pattern detector and said address counter means for storing said channel identifying signal, said fixed signal and said all zero signal in addresses designated by and output of said address counter, a pseudo random code generator connected to said address counter means and said pattern detector, a comparator connected to said series parallel converter and said pseudo random code generator for comparing an output of said series/parallel converter with an output of said pseudo random code generator, and an accumulator connected to said comparator for accumulating an output of said comparator, and means connected to said accumulator for writing a value accumulated in said accumulator into said output register at each predetermined interval.

* * * * *